United States Patent [19]
Podszun et al.

[11] Patent Number: 5,093,445
[45] Date of Patent: Mar. 3, 1992

[54] BEAD POLYMERS CONTAINING FLUORINE

[75] Inventors: Wolfgang Podszun, Cologne; Carlhans Süling, Odenthal, both of Fed. Rep. of Germany; Walter De Winter, s-Gravenwezel; Daniel Timmerman, Mortsel, both of Belgium

[73] Assignee: Agfa-Gevaert Aktiengesellschaft, Leverkusen, Fed. Rep. of Germany

[21] Appl. No.: 160,822

[22] Filed: Feb. 26, 1988

[30] Foreign Application Priority Data

Mar. 12, 1987 [DE] Fed. Rep. of Germany ....... 3708032

[51] Int. Cl.$^5$ ................... C08F 228/02; C08F 220/12
[52] U.S. Cl. .................... 526/243; 526/245; 526/247
[58] Field of Search ............... 526/243, 245, 247

[56] References Cited

U.S. PATENT DOCUMENTS 4,720,166  1/1988  Ohmori ............... 350/96.34
4,885,350  12/1989  Yamashita ............ 526/201

FOREIGN PATENT DOCUMENTS 198252  10/1986  European Pat. Off. .

Primary Examiner—Christopher Henderson
Attorney, Agent, or Firm—Connolly and Hutz

[57] ABSTRACT

Bead polymers having an average particle diameter of from 0.5 to 10 μm and a narrow particle diameter distribution of $K \leq 0.25$ and containing from 1 to 60% by weight of chemically bound fluorine are suitable for use as matting agents and spacers in photographic recording materials.

4 Claims, No Drawings

BEAD POLYMERS CONTAINING FLUORINE

The present invention relates to bead polymers containing fluorine, having an average particle diameter (mass average) of from 0.5 to 10 μm and a narrow particle diameter distribution, and to a process for their preparation.

Finely divided bead polymers with narrow particle diameter distribution based on selected monomers and monomer combinations, for example, styrene or acrylic acid esters, are already known. Monodisperse particles, for example, may be synthesized by an elaborate two stage process proposed by J. Ugelstad et. al. (Makrom. Chem. 180, 737 (1979) and Adv. Coll. Interf. Sci. 13, 101 (1980)).

Polymer particles in the form of beads having a relatively narrow particle diameter distribution are also obtainable by suspension copolymerisation of maleic acid anhydride and α-olefines (DE-A-2 501 123, DE-A-2 919 822 and DE-A-3 144 793).

Graft polymers in the form of beads obtained from methacrylic acid/methyl methacrylate (graft scions) and maleic acid/α-olefines (graft basis) are known from DE-A-3 331 542.

EP-A-80 225 describes a method for the preparation of stable aqueous dispersions by which, for example, styrene or methyl methacrylate bead polymers having a narrow particle diameter distribution are obtainable.

Bead polymers having an average particle diameter of 1 to 5 μm and a narrow particle diameter distribution are used inter alia in photographic recording materials. They serve e.g. as matting agents or spacers. Their function consists of preventing different parts of the recording material sticking together or sticking to other materials which come into contact with the recording material. This function is to a large extent fulfilled by the known bead polymers.

Recording materials containing the known art bead polymers have, however, the disadvantage that their surface is more easily damaged and they are more difficult to transport in apparatus such as a camera or a projector. These disadvantages may be attributed to the reduced blocking resistance of the photographic material.

It is an object of the present invention to provide bead polymers suitable for use as matting agents or spacers in photographic recording materials and giving rise to materials with improved blocking resistance.

This problem is solved by means of bead polymers having an average particle diameter of from 0.5 to 10 μm and a narrow particle diameter distribution of $K < 0.25$, characterised in that they contain from 1 to 60% by weight of chemically bound fluorine.

They preferably contain from 10 to 40% by weight of bound fluorine.

The factor K is equal to the second cumulant divided by the square of the first cumulant obtained from cumulant analysis of the autocorrelation function of scattered laser light (D. E. Koppel, J. Chem. Phys. 57, 11 (1972) 4814–4820) and is a measure of the width of the distribution range of the particle diameter distribution. The smaller the value of K, the narrower is the particle diameter distribution.

The present invention further relates to a process for the preparation of the above mentioned bead polymers containing fluorine, characterised in that α,β-unsaturated compounds containing fluorine, optionally mixed with α,β-unsaturated compounds free from fluorine, are polymerised in a non-aqueous, polar medium in the presence of a high molecular weight dispersing agent and of a low molecular weight surfactant, using a radical former as initiator.

The bead polymers according to this invention contain from 1 to 60% by weight of chemically bound fluorine, preferably in the form of relatively long chained perfluoroalkyl groups. Perfluoroalkyl groups $C_nF_{2n+1}$ where $n = 4$ to 20, preferably $n = 7$ to 12, are particularly suitable. The perfluoroalkyl groups are components of monomer units which are preferably derived from α,β-unsaturated compounds corresponding to the formula I

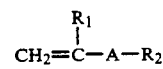

wherein
R₁ denotes H or CH₃,
A denotes —O—,

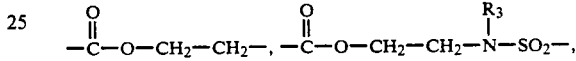

R₂ denotes $—C_nF_{2n+1}$,
R₃ denotes H or C₁ to C₆ alkyl and
n has a value from 4 to 20, preferably from 7 to 12.

These monomer units preferably constitute from 2 to 75% by weight of the polymer.

Bead polymers which are particularly preferred according to the invention contain polymerised monomer units corresponding to formula II

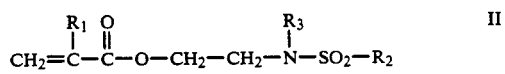

wherein the groups R₁, R₂ and R₃ have the meanings indicated above.

α,β-unsaturated compounds containing perfluoroalkyl groups are known. The synthesis of acrylate derivatives and methacrylate derivatives, for example, is described in FR-PS 2 034 142.

The bead polymers according the invention may contain units derived from α,β-unsaturated compounds free from fluorine in addition to the fluorine-containing monomer units mentioned above.

The following are examples: styrene, α-methylstyrene, vinyltoluene, substituted vinyl toluenes such as vinylbenzyl chloride, (meth)acrylic acid esters such as methyl methacrylate, butyl methacrylate, butyl acrylate and hydroxyethyl methacrylate, butadiene, isobutylene, 2-chlorobutadiene, 2-methyl-butadiene, acrylonitrile and vinylpyridine. Styrene and methacrylic acid esters are preferred, especially methyl methacrylate.

The bead polymers according to this invention may contain a small proportion, e.g. from 0.01 to 2.5% by weight, of bifunctional monomers incorporated by polymerisation as cross linking agents, for example, ethylene dimethacrylate or divinyl benzene.

The average particle diameter of the bead polymers according to the invention is preferably from 1 to 7 μm. The particle diameter distribution is narrow, preferably monodisperse.

For the preparation of the bead polymers according to the invention, the above mentioned α,β-unsaturated compounds containing fluorine, optionally mixed with α,β-unsaturated compounds which are free from fluorine, are polymerised in a polar medium in the presence of a high molecular weight dispersing agent and a low molecular weight surfactant.

The polar medium consists predominantly of non aqueous solvents such as dioxane, acetone, acetonitrile, dimethylformamide and alcohols. Lower alcohols are preferred, in particular methanol, ethanol, n-propanol, iso-propanol, n-butanol, iso-butanol and tert.-butanol. Mixtures of different solvents are also suitable, in particular mixtures of different alcohols.

When solvent mixtures are used, these may contain up to 50% by weight of apolar solvents, in particular hydrocarbons such as hexane or heptane.

The high molecular weight dispersing agents used may be natural or synthetic macromolecular compounds which are soluble in the polar medium used and have a molecular weight $M_w$ (gel permeation chromatography) of from $5 \times 10^3$ to $5 \times 10^5$, preferably from $10^4$ to $2 \times 10^5$. Examples include cellulose derivatives such as methyl cellulose, ethyl cellulose and hydroxypropyl cellulose as well as polyvinyl acetate. Partially saponified polyvinyl acetates, preferably with a degree of saponification of from 5 to 25%, are particularly suitable. Polyvinyl pyrrolidone, substituted polyvinyl pyrrolidones, polyvinyl caprolactam and copolymers of vinyl pyrrolidone and vinyl caprolactam are also suitable. These are preferably used in quantities of from 1 to 10% by weight, based on the polar medium.

The low molecular weight surfactants used may be either ionic or non-ionic but ionic surfactants are particularly suitable. Sodium salts of sulfosuccinic acid esters are suitable anionic surfactants and N-alkyl-ammonium salts, e.g. methyl tricaprylyl ammonium chloride, are suitable cationic surfactants. The molecular weight of suitable surfactants is below 1000. The surfactants are preferably used in quantities of from 0.2 to 5% by weight, in particular from 0.5 to 2% by weight, based on the polar medium.

Polymerisation is initiated with conventional radical formers, in particular peroxy compounds and azo compounds. Azo diisobutyric acid nitrile, for example, is a suitable initiator.

The polymerisation temperature employed depends upon the decomposition temperature of the initiator and the boiling point of the solvent and is preferably in the range of from 50° to 140° C. Polymerisation is advantageously carried out at the boiling point of the solvent. The polymerisation time generally extends over several hours (e.g. 2 to 12 hours).

The particle diameter of the bead polymer may be controlled by the choice of solvent. Thus the particle diameter decreases from n-propanol to ethanol to methanol. The particle diameter can be infinitely adjusted by mixing solvents with different solubility parameters.

The product obtained at the end of polymerisation is a polymer dispersion. This dispersion may be used for many applications without further working up.

If isolation of the bead polymer is desired, this may be carried out by centrifuging or by precipitation, for example with water or a hydrocarbon such as hexane.

The bead polymers according to this invention are suitable for use as matting agents and spacers in photographic recording materials, for example in photographic elements based on photosensitive silver halide emulsion layers. The recording materials obtained according to the invention are distinguished by their high surface quality and good sliding properties.

EXAMPLE 1

Solutions were prepared in each case by dissolving 14 g of polyvinyl pyrrolidone, 4 g of methyltricaprylyl ammonium chloride and 0.25 g of azo-diisobutyronitrile in 400 ml of methanol in a reaction flask equipped with reflux condenser, stirrer and thermometer. 25 g of monomer mixture having the following composition were added to each solution:

|  | a | b | c |
| --- | --- | --- | --- |
| N-methyl-N-perfluoroctyl-sulfonamidoethyl acrylate | 6.25 g | 8.3 g | 12.5 g |
| Methyl methacrylate | 18.75 g | 16.7 g | 12.5 g |

The mixture was heated under reflux for 5 hours with stirring. The dispersions obtained were centrifuged for 15 minutes at 2500 revs per min. The isolated solid was washed in methanol and dried in a drying cupboard at 60° C.

|  | a | b | c |
| --- | --- | --- | --- |
| Yield (%) | 17.8 | 19.2 | 18.5 |
| Average particle diameter (μm) | 3.5 | 4.2 | 4.3 |
| fluorine content (% by weight) | 15.6 | 22.0 | 27.7 |

EXAMPLE 2

Samples of 25 g of monomer mixture obtained from 6.25 g of N-methyl-N-perfluoroctyl-sulfonamidoethyl-methacrylate and 18.75 g of methyl methacrylate were polymerised in
a) 400 ml of methanol
b) 300 ml of methanol + 100 ml of ethanol
c) 400 ml of ethanol
by the method described in Example 1.

The particle diameters were measured by scattered laser light spectroscopy.

|  | a | b | c |
| --- | --- | --- | --- |
| Particle diameter (μm) | 3.9 | 4.8 | 7.5 |
| K | 0.07 | 0.09 | 0.35 |

The K values of experiments a and b correspond to values found for monodisperse dispersions.

EXAMPLE 3

700 g of polyvinyl pyrrolidone, 200 g of methyltricapryl ammonium chloride and 12.5 g of azodiisobutyronitrile were dissolved in 20 liters of solvent by the method described in Example 1 and a mixture of 937.5 g of methyl methacrylate and 312.5 g of N-methyl-N-perfluoroctyl-sulfonamidoethylmethacrylate was polymerised in the resulting solution for 10 hours at 65° C. The following solvents were used:

|  | a | b | c |
| --- | --- | --- | --- |
| Methanol (l) | 20 | 18 | 12 |
| Hexane (l) | — | 2 | 6 |

The particle diameters of the polymers obtained were determined by scattered laser light spectroscopy.

|  | a | b | c |
|---|---|---|---|
| Particle diameter (μm) | 4.0 | 3.4 | 2.8 |
| K | 0.09 | 0.08 | 0.08 |

EXAMPLE 4

A silver iodobromide X-ray emulsion (2 mol % iodide) containing, per kg, 80 g of gelatine and silver halide in a quantity corresponding to 190 g of silver nitrate was applied to both sides of a cellulose triacetate support which had been covered with adhesive layers. 27 m² of surface were coated with 1 kg of emulsion.

A protective layer was formed on the wet emulsion layers on both sides of the support by application from the following casting solution:

| gelatine | 30 g |
|---|---|
| 5% by weight aqueous solution of sodium diisooctyl sulfosuccinate | 28 ml |
| antistatic agent | 2 g |
| 4% by weight aqueous formaldehyde solution | 30 ml |
| matting agent | (see below) |
| water | up to 1000 ml |

The antistatic agent used was a 10% by weight aqueous solution of ethoxylated ricinoleic acid containing 40% by weight of ethylene oxide groups. The polymer obtained according to Example 3 (sample a) was used as matting agent.

This bead polymer, which had an average particle diameter of 4 μm, was dispersed in water. The dispersion obtained was filtered through a nylon gauze with a mesh of 60×60 μm.

16 g of the bead polymers obtained were introduced into an aqueous solution of 48.4 g of gelatine containing 7.5 ml of a 25% by weight ethanolic solution of phenol and the resulting mixture was diluted to a volume of 500 ml with water.

To 30 g of this dispersion was then added 1 liter of a casting solution for the protective layer to be applied to an X-ray film containing silver halide. 1 liter of the casting solution was cast on 34 m². After drying, the protective layer contained 26 mg of bead polymer/m².

A material containing the same quantity of a dispersion of polymethyl methacrylate particles as matting agent was prepared for comparison. The dispersion was obtained by introducing the solution of the polymer in ethyl acetate into water.

The static and dynamic coefficient of friction of the protective layers were determined by comparison with stainless steel. The determination was carried out by means of an apparatus described in Journal of Scientific Instruments, volume 28, July 1951, page 220.

|  | Coefficient of friction | |
|---|---|---|
|  | static | dynamic |
| Protective layer containing bead polymers according to the invention | 0.19 | 0.14 |
| polymethylene methacrylate beads | 0.44 | 0.37 |

The X-ray material containing the bead polymers according to this invention thus has improved blocking resistance.

We claim:

1. Bead polymers containing from 1 to 60% by weight of chemically bound fluorine and having an average particle diameter of from 0.5 to 10 μm and a narrow particle diameter distribution of K<0.25.

2. Bead polymers according to claim 1, characterised in that they contain 2 to 75% by weight of copolymerised monomer units corresponding to formula I:

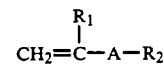

wherein
A denotes —O—,

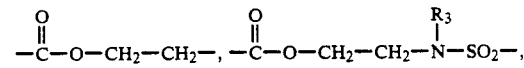

$R_1$ denotes H, $CH_3$
$R_2$ denotes —$C_nF_{2n+1}$,
$R_3$ denotes H, $C_1$ to $C_6$-alkyl and
n represents a value from 4 to 20.

3. Bead polymers according to claim 1, characterised in that they contain from 2 to 75% by weight of copolymerised monomer units corresponding to formula II

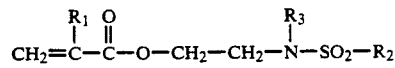

wherein $R_1$, $R_2$ and $R_3$ have the meanings indicated in claim 2.

4. Bead polymers according to claim 3, characterised in that they contain from 2 to 75% by weight of copolymerised monomer units corresponding to formula II and from 25 to 98% by weight of co-polymerised methyl methacrylate.

* * * * *